Figure 1:
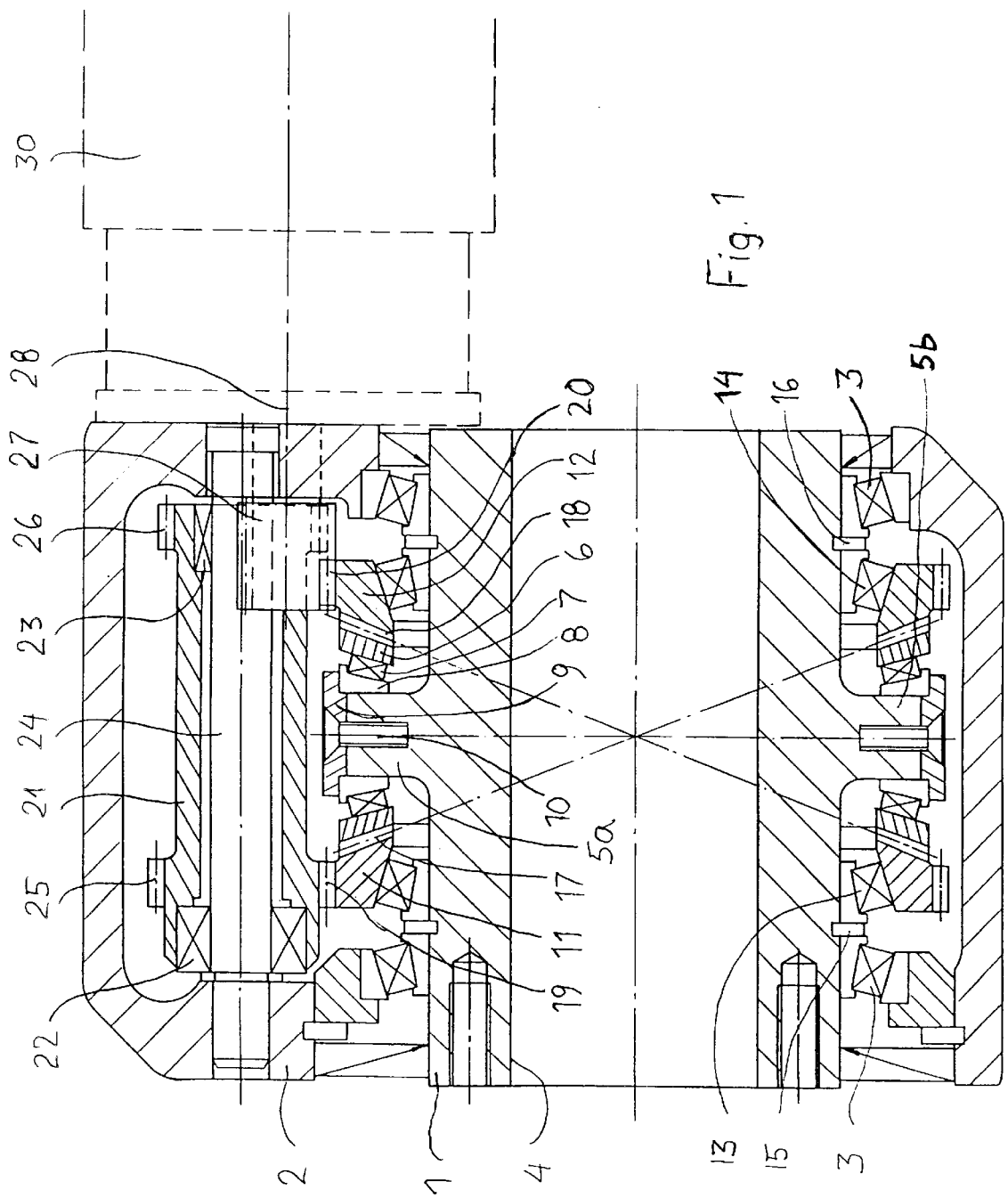

United States Patent [19]
Arbrink

[11] Patent Number: 5,993,348
[45] Date of Patent: Nov. 30, 1999

[54] COMPACT TOOTHED WHEEL GEARING WITH LARGE GEAR RATIO

[75] Inventor: Richard Arbrink, Västerås, Sweden

[73] Assignee: ASEA Brown Boveri AB, Vasteras, Sweden

[21] Appl. No.: 08/983,014

[22] PCT Filed: Mar. 6, 1996

[86] PCT No.: PCT/SE96/00926

§ 371 Date: Oct. 5, 1998

§ 102(e) Date: Oct. 5, 1998

[87] PCT Pub. No.: WO97/02442

PCT Pub. Date: Jan. 23, 1997

[30] Foreign Application Priority Data

Jul. 6, 1995 [SE] Sweden .................................. 9502476

[51] Int. Cl.[6] .............................. F16H 1/28; F16H 37/04; B25J 18/00
[52] U.S. Cl. .............................. 475/329; 475/336; 901/26
[58] Field of Search .............................. 901/26; 475/207, 475/220, 336, 339; 74/412 R, 413, 416

[56] References Cited

U.S. PATENT DOCUMENTS

| | | | |
|---|---|---|---|
| 140,622 | 8/1873 | Gilfillan | 475/336 |
| 1,802,112 | 4/1931 | Henderson et al. | |
| 2,019,343 | 10/1935 | Gaffner | |
| 2,390,742 | 12/1945 | Setterlund | 475/329 |
| 4,047,448 | 9/1977 | Pardo et al. | |
| 4,532,828 | 8/1985 | Laguardia | 475/329 X |
| 5,149,310 | 9/1992 | Damino | |
| 5,575,179 | 11/1996 | Arbrink | 475/336 X |

FOREIGN PATENT DOCUMENTS

| | | | |
|---|---|---|---|
| 992172 | 10/1951 | France | 475/329 |
| 718600 | 3/1942 | Germany | 475/329 |
| 9203888 | 7/1994 | Sweden | |
| 177341 | 8/1935 | Switzerland | 475/329 |
| 442462 | 2/1936 | United Kingdom | 475/329 |

*Primary Examiner*—Khoi Q. Ta
*Attorney, Agent, or Firm*—Hodgson, Russ, Andrews, Woods & Goodyear

[57] ABSTRACT

A compact gear system that includes an input shaft (28), an output shaft (1) and gear wheel means which drivingly connect the same, wherein the output shaft (1) is journalled in a gear housing (2). The output shaft (1) is hollow and has pins (5a) which project radially outwards in a normal plane and each of which carries a gear wheel (6). Provided on each side of the pins is a respective crown wheel (11, 12) journalled on the output shaft (1) and having a toothed ring (17, 18) in engagement with the gear wheel (6). Each crown wheel also has a cylindrical toothed ring (19, 20) which coacts at different transmission ratios with a respective toothed ring (25, 26) on an eccentric shaft (21) which extends parallel with the output shaft (1) and which is rotatably journalled in the housing (2), wherein the eccentric shaft (21) is driven by the input shaft (28). As the input shaft (28) rotates, the pins are forced to rotate about the center axis of the output shaft (1) and therewith entrain the output shaft with high reduction. The compact gear system is particularly intended for rotating the arm of an industrial robot in relation to the robot frame.

27 Claims, 2 Drawing Sheets

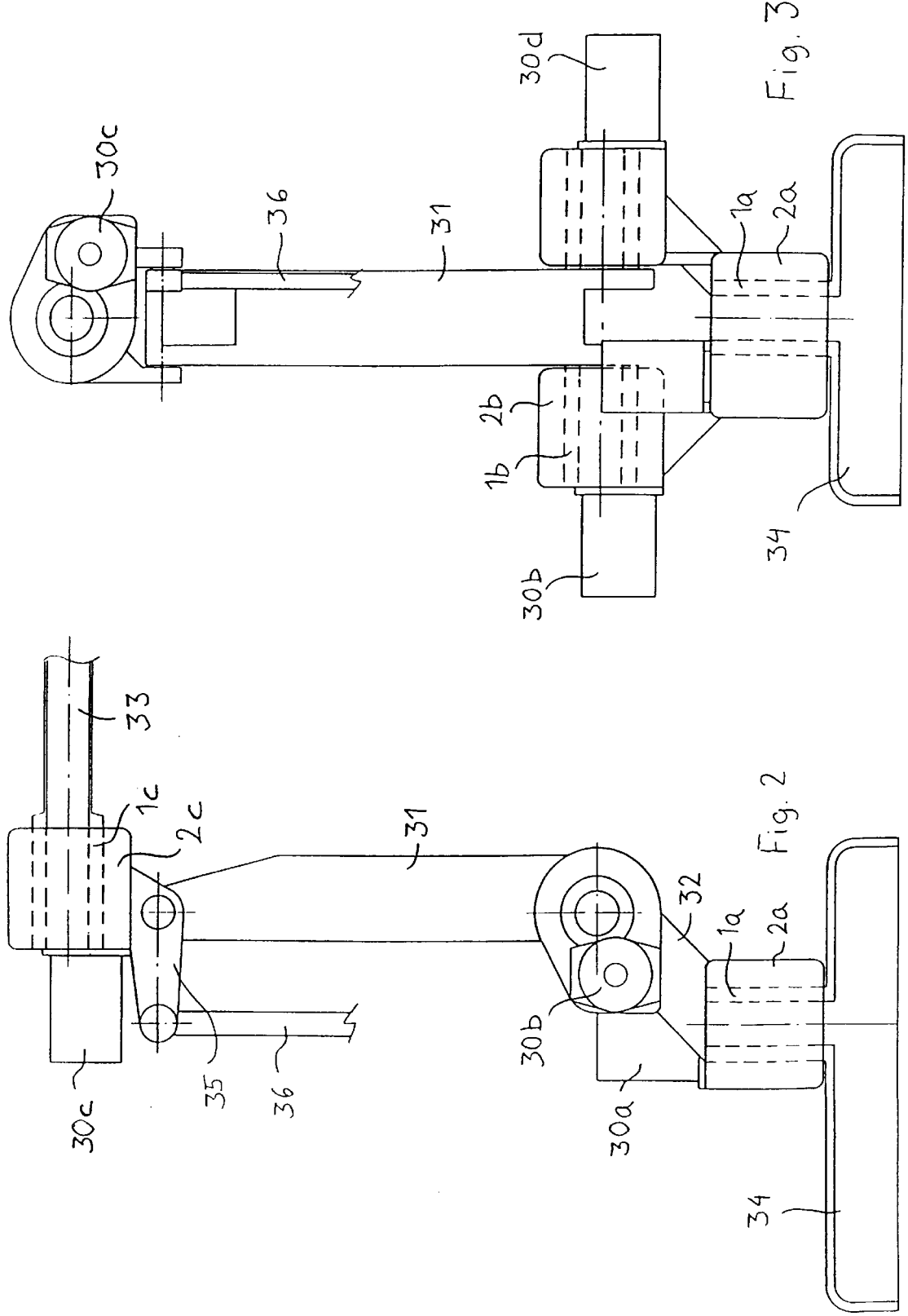

COMPACT TOOTHED WHEEL GEARING WITH LARGE GEAR RATIO

The present invention relates to a compact gear system of the kind defined in the preamble of claim 1. A compact gear system is constructed to provide a high transmission ratio between an input drive shaft and an output shaft within a small space. Such application is required in the case of industrial robots with which a robot arm is pivotal in relation to a frame and the pivotal movement is achieved with the aid of a drive motor whose rotational speed must be geared down considerably without the assistance of over-bulky transmission devices.

U.S. Pat. No. 1,802,112 teaches a differential type of reduction gear with which very high transmission ratios can be achieved. This reduction gear includes a relatively large number of gear wheels, all of which are conical and require input and output shafts to be mutually perpendicular. Such reduction gears incur high manufacturing costs, take up a relatively large amount of space, and are difficult to adapt to suit different applications.

SE 500 626 teaches a similar gear in which some of these drawbacks are alleviated. This gear, however, also has certain drawbacks. Although the output shaft is hollow, a transverse shaft included in the gear partially blocks the shaft bore and therewith makes it difficult to utilize the space in the hollow shaft. Because it may be advantageous, particularly in the case of industrial robot applications, to use the hollow shaft as ducting for electric cables, different media such as air, water and paint, and other drive shafts, the obstructive transverse shaft constitutes a disadvantage. Furthermore, it is necessary for the input shaft to define a given small angle with the normal plane of the output shaft, which increases the precision required and makes assembly more complicated.

The object of the present invention is to provide a compact gear system of the aforesaid kind in which those drawbacks associated with the known gear systems are avoided.

This object is achieved in accordance with the invention with a compact gear system of the kind defined in the preamble of claim 1 and having the characteristic features set forth in the characterizing clause of said claim.

Because input and output shafts are parallel and connected drive-wise in the given manner, the gear system is simple to assemble, its housing requires working from only one side, and the system is reliable in operation and affords a very compact design. The transmission ratio can be changed with the aid of relatively simple modifications. Furthermore, the gear system takes up none of the space in the hollow shaft, which is extremely beneficial as before mentioned.

It is advantageous to permit the drive gear wheel on the input shaft to drive directly one crown wheel, and to drive the other crown wheel through the medium of an eccentric shaft, therewith enhancing the possibility of obtaining a compact and readily assembled design.

In another preferred embodiment, the gear housing is connected to a robot arm and the output shaft is connected to a frame structure, or vice versa, resulting in an application of the invention where its advantages are of great significance.

These and other advantageous embodiments of the invention will be apparent from the dependent claims.

The invention will now be described in more detail with reference to a preferred embodiment thereof and also with reference to the accompanying drawings, in which FIG. 1 is a sectional view of an inventive compact gear system;

FIG. 2 is a schematic side view of an industrial robot fitted with an inventive gear system; and FIG. 3 is a schematic end view of the industrial robot shown in FIG. 2.

FIG. 1 shows the output shaft 1 rotatably journalled in a gear housing 2 by means of bearings 3. The shaft is hollow and has a through-penetrating cylindrical bore 4 that can be used for the passage of electric cables, media, or other drive shafts. The output shaft 1 includes a plurality of pins 5a, 5b, in the illustrated case two pins, which extend in a normal plane radially outwards and which are formed integrally with the shaft 1. A conical gear wheel 6 is journalled in bearing 7 for rotation about each pin 5a, 5b, wherein the bearing is supported by a bearing seat 8 mounted on the pin 5a and held firm by means of a plate or washer 9. The plate 9 is secured to the pin by a radial screw 10. All of the conical gear wheels 6 journalled on the pins 5a, 5b have mutually the same diameter and the same number of teeth. Although only one pin 5a and associated gear wheel 6 will suffice, two pins will provide greater reliability in operation when large moments of force are anticipated, and in some applications three or four pins and associated gear wheels may be necessary. A crown wheel 11, 12 is journalled in a respective bearing 13 and 14 for rotation about the output shaft 1 on each side of the normal plane in which the pins 5a, 5b are disposed, said bearings being firmly held axially by a respective locking ring 15 and 16. Each of the two crown wheels 11, 12 has a conical toothed ring 17 and 18 respectively, and a respective cylindrical toothed ring 19 and 20. the crown wheels 11, 12 are mutually identical and their respective conical toothed rings 17 and 18 are in engagement with the two conical gear wheels 6.

Extending parallel with the output shaft 1 is a hollow eccentric shaft 21 which is rotatably journalled in bearings 22, 23 on a shaft 24 fixedly mounted to the gear housing 2. Mounted on each end of the eccentric shaft 21 is & respective cylindrical toothed ring 25 and 26 which have mutually different tooth numbers, wherein in the case of the illustrated embodiment the toothed ring 25 located to the left of the Figure has more teeth than the other toothed ring 26. The toothed ring 25 on the left of the Figure engages with the cylindrical toothed ring 19 of the left-hand crown wheel 11, whereas the right-hand toothed ring 26 on the eccentric shaft engages with a pinion wheel 27 on the input shaft 28 connected to a motor 30. The pinion wheel 27 also engages with the cylindrical toothed ring 20 of the right-hand crown wheel 12.

The illustrated gear system functions in the following manner. The pinion wheel drives the right-hand crown wheel 12 directly through its engagement with the cylindrical toothed ring 20 of the crown wheel 12, and drives the left-hand crown wheel 11 via the two toothed rings 26 and 25 on the eccentric shaft 21. Because the left-hand toothed ring 25 on the eccentric shaft 21 has more teeth than the right-hand toothed ring 26, the left-hand crown wheel 11 will rotate at a slightly higher speed than the right-hand crown wheel 12. When $z_1$=the number of teeth on the pinion wheel 27, $z_2$=the number of teeth on the right-hand toothed ring 26 on the eccentric shaft, $z_3$=the number of teeth on the left-hand toothed ring 25 on the eccentric shaft, and $z_4$=the number of teeth on the cylindrical toothed ring 19 and 20 of respective crown wheels 11, 12, the following relationships will be obtained when $n_I$ denotes the rotational speed of the input shaft 28.

The right-hand crown wheel 12 will rotate at the speed:

$$n_h = n_i \times \frac{z_1}{z_4}$$

The eccentric shaft will rotate at the speed:

$$n_e = n_i \times \frac{z_1}{z_2}$$

The left-hand crown wheel will rotate at the speed:

$$n_v = n_e \times \frac{z_3}{z_4} = n_i \times \frac{z_1}{z_2} \times \frac{z_3}{z_4}$$

The speed differential between the two crown wheels 11, 12 will then be $$n_v - n_h = n_i \times \frac{z_1}{z_4}\left[\frac{z_3}{z_2} - 1\right], \text{ wherein the}$$

two wheels 11, 12 rotate in mutually different directions.

The conical toothed rings 17, 18 of respective crown wheels 11, 12 are in engagement with the conical gear wheel 6 and as a result of said speed difference, the pin 5a on which the conical gear wheel 6 is journalled will be forced to rotate about the centre axis of the output shaft 1. Since the pin 5a (and the pin 5b) is fixedly connected to the output shaft 1, the output shaft will accompany rotation of the pin. The rotational speed will be half the speed difference between the speeds of respective crown wheels 11, 12, i.e. the output shaft 1 will rotate at the speed:

$$n_u = \frac{1}{2}n_1 \times \frac{z_1}{z_4}\left[\frac{z_3}{z_2} - 1\right]$$

The transmission ratio will thus be:

$$\frac{n_1}{n_u} = \frac{2z_4}{z_1} \times \frac{z_2}{z_3 - z_2}$$

Transmission ratios in the order of 100:1 to 400:1 can be readily achieved with a suitable combination of toothed ring tooth numbers. For instance, when $z_1=20$, $z_2=33$, $z_3=36$ and $z_4$ is 150, the transmission ratio will be:

$$\frac{n_i}{n_u} = 2 \times \frac{150}{20} \times \frac{33}{36-33} = 165:1$$

FIGS. 2 and 3 illustrate how the inventive compact gear system can be used with an industrial robot, where in the illustrated case an inventive gear system is provided at a number of different places. A first compact gear system is arranged with its output shaft 1a connected to the foot 34 of the robot, and with its housing 2a connected to the frame structure 32 for achieving pivotal movement of the frame structure 32 about the foot 34, and is driven by the motor 30a. The lower arm 31 of the robot is similarly pivotal in relation to the frame structure 32 through the medium of the compact gear system driven by motor 30b.

The upper arm 33 of the robot is pivoted or rotated by a third compact gear system driven by motor 30c. This output shaft 1c is connected to the upper arm 33 and its housing 2c by a lever 35 pivotally mounted on the upper and of the lower arm 31. The lever 35 is swung about its pivot axle in the lower arm 31 by a parallel strut 36 which is manoeuvered by a fourth compact gear system driven by motor 30d.

It will be understood that the invention is not restricted to the aforedescribed embodiment of a compact gear system. For instance the gear wheel 6 need not be conical, but may be cylindrical instead, e.g. of the kind marketed under the trademark Cylkro. Neither are the toothed rings 17 and 18 restricted herewith to a conical configuration.

I claim:

1. A compact gear system having a high transmission ratio and including a gear housing (2), an input shaft (28), an output shaft (1) journalled into the gear housing (2), and gear wheel means which connect drive-wise the input (28) and output (1) shafts, characterized in that said output shaft (1) is parallel with the input shaft (28);

said output shaft (1) has fixedly mounted thereon in a normal plane at least one radially outwards projecting pin (5a), wherein a gear wheel (6) is rotatably journalled on each said pin (5a);

first (11) and second (12) crown wheels are rotatably journalled on said output shaft (1) on each respective side of each said pin (5a), wherein each crown wheel includes a first toothed ring (17, 18) and a second cylindrical toothed ring (19, 20), and wherein the first toothed ring (17, 18) engages with each gear wheel (6); and an offset shaft (21), which extends parallel with said output shaft (1) and which is driven by a pinion wheel (27) of said input shaft (28), includes first and second toothed rings (25, 26), wherein the first toothed ring (25) coacts with the cylindrical toothed ring (19) of the first crown wheel (11) at a first transmission ratio, and wherein the pinion wheel (27) of said input shaft (28) is in engagement with said second toothed ring (26) and with the cylindrical toothed ring (20), thereby defining a second transmission ratio which is the ratio of the number of teeth of said pinion wheel (27) and the number of teeth of said second toothed ring (26) and further defining a third transmission ratio which is the ratio of the number of teeth of said pinion wheel (27) and the number of teeth of the cylindrical toothed ring (20), and wherein said second transmission ratio differs from the first transmission ratio.

2. A compact gear system according to claim 1 in which the output shaft (1) is hollow and includes a continuous bore (4) through which electric cables, media-carrying conduits and other drive shafts can be passed.

3. A compact gear system according to claim 1 in which the output shaft (1) includes two radially outwards projecting pins (5a, 5b).

4. A compact gear system according to claim 1 in which the input shaft (28) is drivingly connected to the eccentric shaft (21) by virtue of the engagement of a gear wheel (27) fixedly connected to the input shaft (28) with said second gear wheel (26), wherein said gear wheel (27) is also in engagement with the cylindrical toothed ring (20) of the second crown wheel (12).

5. A compact gear system according to claim 1 in which the first (25) and the second (26) toothed rings have mutually different tooth numbers, wherein the cylindrical toothed rings (19, 20) of respective first (11) and second (12) crown wheels have mutually the same tooth number, and wherein the first toothed rings (17, 18) of respective first (11) and second (12) crown wheels have mutually the same tooth number.

6. A compact gear system according to claim 1, wherein the offset shaft (21) is hollow and is rotatably journalled on a carrier shaft (24) by internal bearings (22, 23), and wherein said carrier shaft (24) is fixedly connected to the gear housing (2).

7. A compact gear system according to claim 1, wherein either the output shaft (1b) or the gear housing (2b) is connected to a robot frame (32) and the other to a robot arm (31).

8. A compact gear system according to claim 1, wherein either the output shaft (1c) or the gear housing (2c) is connected to a first robot arm (33) and the other to a lever (35) which is rotatably mounted on a second robot arm (31) and provided with a maneuvering strut (36).

9. A compact gear system according to claim 2 in which the output shaft (1) includes two radially outwards projecting pins (5a, 5b).

10. A compact gear system according to claim 2 in which the input shaft (28) is drivingly connected to the offset shaft (21) by virtue of the engagement of a pinion wheel (27) fixedly connected to the input shaft (28) with said second toothed ring (26), wherein said pinion wheel (27) is also in engagement with the cylindrical toothed ring (20) of the second crown wheel (12).

11. A compact gear system according to claim 2 in which the first (25) and the second (26) toothed rings have mutually different tooth numbers, wherein the cylindrical toothed rings (19, 20) of respective first (11) and second (12) crown wheels have mutually the same tooth number, and wherein the first toothed rings (17, 18) of respective first (11) and second (12) crown wheels have mutually the same tooth number.

12. A compact gear system according to claim 3 in which the first (25) and the second (26) toothed rings have mutually different tooth numbers, wherein the cylindrical toothed rings (19, 20) of respective first (11) and second (12) crown wheels have mutually the same tooth number.

13. A compact gear system according to claim 4 in which the first (25) and the second (26) toothed rings have mutually different tooth numbers, wherein the cylindrical toothed rings (19, 20) of respective first (11) and second (12) crown wheels have mutually the same tooth number, and wherein the first toothed rings (17, 18) of respective first (11) and second (12) crown wheels have mutually the same tooth number.

14. A compact gear system according to claim 2, wherein the offset shaft (21) is hollow and is rotatably journalled on a carrier shaft (24) by internal bearings (22, 23), and wherein said carrier shaft (24) is fixedly connected to the gear housing (2).

15. A compact gear system according to claim 3, wherein the offset shaft (21) is hollow and is rotatably journalled on a carrier shaft (24) by internal bearings (22, 23), and wherein said carrier shaft (24) is fixedly connected to the gear housing (2).

16. A compact gear system to claim 4, wherein the offset shaft (21) is hollow and is rotatably journalled on a carrier shaft (24) by internal bearings (22, 23), and wherein said carrier shaft (24) is fixedly connected to the gear housing (2).

17. A compact gear system according to claim 5, wherein the offset shaft (21) is hollow and is rotatably journalled on a carrier shaft (24) by internal bearings (22, 23), and wherein said carrier shaft (24) is fixedly connected to the gear housing (2).

18. A compact gear system according to claim 2, wherein either the output shaft (1b) or the gear housing (2b) is connected to a robot frame (32) and the other to a robot arm (31).

19. A compact gear system according to claim 3, wherein either the output shaft (1b) or the gear housing (2b) is connected to a robot frame (32) and the other to a robot arm (31).

20. A compact gear system according to claim 4, wherein either the output shaft (1b) or the gear housing (2b) is connected to a robot frame (32) and the other to a robot arm (31).

21. A compact gear system according to claim 5, wherein either the output shaft (1b) or the gear housing (2b) is connected to a robot frame (32) and the other to a robot arm (31).

22. A compact gear system according to claim 6, wherein either the output shaft (1b) or the gear housing (2b) is connected to a robot frame (32) and the other to a robot arm (31).

23. A compact gear system according to claim 2, wherein either the output shaft (1c) or the gear housing (2c) is connected to a first robot arm (33) and the other to a lever (35) which is rotatably mounted on a second robot arm (31) and provided with a maneuvering strut (36).

24. A compact gear system according to claim 3, wherein either the output shaft (1c) or the gear housing (2c) is connected to a first robot arm (33) and the other to a lever (35) which is rotatably mounted on a second robot arm (31) and provided with a maneuvering strut (36).

25. A compact gear system according to claim 4, wherein either the output shaft (1c) or the gear housing (2c) is connected to a first robot arm (33) and the other to a lever (35) which is rotatably mounted on a second robot arm (31) and provided with a maneuvering strut (36).

26. A compact gear system according to claim 5, wherein either the output shaft (1c) or the gear housing (2c) is connected to a first robot arm (33) and the other to a lever (35) which is rotatably mounted on a second robot arm (31) and provided with a maneuvering strut (36).

27. A compact gear system according to claim 6, wherein either the output shaft (1c) or the gear housing (2c) is connected to a first robot arm (33) and the other to a lever (35) which is rotatably mounted on a second robot arm (31) and provided with a maneuvering strut (36).

* * * * *